(12) United States Patent
Nesper et al.

(10) Patent No.: US 7,777,062 B2
(45) Date of Patent: Aug. 17, 2010

(54) METHOD FOR PRODUCTION OF A B/N/C/SI CERAMIC FROM A BORAZINE PRECURSOR, CERAMICS MADE BY SAID METHOD AND USE OF THE CERAMIC MADE BY SAID METHOD

(75) Inventors: Reinhard Nesper, Kilchberg (CH); Hansjörg Grützmacher, Wettswil (CH); Jörg Haberecht, Zürich (CH)

(73) Assignee: Eidgenossische Technische Hochschule Zurich, Zurich (CH)

( * ) Notice: Subject to any disclaimer, the term of this patent is extended or adjusted under 35 U.S.C. 154(b) by 1023 days.

(21) Appl. No.: 10/544,211

(22) PCT Filed: Feb. 2, 2004

(86) PCT No.: PCT/CH2004/000052

§ 371 (c)(1), (2), (4) Date: May 30, 2006

(87) PCT Pub. No.: WO2004/069768

PCT Pub. Date: Aug. 19, 2004

(65) Prior Publication Data

US 2006/0293164 A1 Dec. 28, 2006

(30) Foreign Application Priority Data

Feb. 3, 2003 (CH) ..................... 0149/03

(51) Int. Cl.
C04B 35/563 (2006.01)
C04B 35/571 (2006.01)
C04B 35/583 (2006.01)
C04B 35/589 (2006.01)
C07F 5/05 (2006.01)
C07F 7/08 (2006.01)

(52) U.S. Cl. ................................ 556/403

(58) Field of Classification Search .................. 556/403
See application file for complete search history.

(56) References Cited

U.S. PATENT DOCUMENTS

| | | | | |
|---|---|---|---|---|
| 5,188,757 A * | 2/1993 | Paine et al. | ............ | 252/183.11 |
| 5,455,367 A * | 10/1995 | Klein et al. | .................. | 556/474 |
| RE36,573 E * | 2/2000 | Barrow et al. | ............ | 427/376.1 |
| 7,148,368 B2 * | 12/2006 | Jansen et al. | ................ | 556/402 |
| 2004/0039217 A1 | 2/2004 | Jansen et al. | | |

FOREIGN PATENT DOCUMENTS

| | | |
|---|---|---|
| DE | 101 08 069 A1 | 8/2002 |
| DE | 10108069 A1 * | 8/2002 |
| WO | WO 02/02265 A1 | 3/2002 |

OTHER PUBLICATIONS

Jaschke et al., 14 Appl. Organomet. Chem., 671-685 (2000).*
Krummland, (Dissertation, University of Hamburg, 2001).*
Haberecth et al., Dalton Trans., 2126-32 (2003).*
Butchereit, E. et al., "Beneficial effect of aluminum on the oxidation behavior of precursor-derived ceramics", Proceedings—Electrochemical Society, (2003), pp. 325-338.
Haug, R. et al., "Plastic Forming of Preceramic Polymers", Journal of the European Ceramic, (1999), vol. 19, No. 1, pp. 1-6.
Hermann, A. et al., "Structure and Electronic Transport Properties of Si-(B)-C-N Ceramics", J. Am. Ceram. Soc., (2001), vol. 84, No. 10, pp. 2260-2264.

* cited by examiner

Primary Examiner—Daniel M Sullivan
Assistant Examiner—Yevegeny Valenrod
(74) Attorney, Agent, or Firm—Browdy & Neimark, PLLC

(57) ABSTRACT

B-tris(silylvinyl)borazine is pyrolysed as a borazine precursor for the production of a B/N/C/Si ceramic. A high-temperature ceramic is obtained by means of a further pyrolysis at higher temperatures after a pre-pyrolysis, which is of high purity and essentially free of pores. The ceramic furthermore contains essentially no oxygen and is particularly suitable as a coating material and for the production of heating elements.

13 Claims, 3 Drawing Sheets

METHOD FOR PRODUCTION OF A B/N/C/SI CERAMIC FROM A BORAZINE PRECURSOR, CERAMICS MADE BY SAID METHOD AND USE OF THE CERAMIC MADE BY SAID METHOD

The production of ceramics and, in particular, high-performance ceramics from borazine precursors is known. Nitride and carbonitride ceramics containing boron and silicon are of particular importance because of, in particular, their high thermal stability and oxidation resistance.

High-temperature-stable silicon borocarbonitride ceramics from silylalkylborazines and processes for producing them have become known from WO 02/22625. The borazines used as precursor each have the structural element Si—C—B—N. To produce a silicon borocarbonitride ceramic, a silylalkylborane is pyrolyzed in an inert or ammonia-containing atmosphere at temperatures of from −200° C. to +2000° C. The resulting product is calcined in an inert or ammonia-containing atmosphere at temperatures of from 800° C. to 2000° C. N—Si—C—B—N structural units are said to be present in such a ceramic.

New molecular and polymeric precursors for B/N/C/Si ceramics are known from the thesis ETH No. 14179 by Anja Krummland. These ceramics are produced using B-triethynylborazine as starting material. Borazines as precursor are prepared by catalytic hydrosilylation. In particular, B-tris(trichlorosilylvinyl)borazine is crosslinked via hydrolyzable $SiCl_3$ and $Si(OR)_3$ groups by means of a sol-gel process and by means of an ammonolysis. The resulting ceramics are said to be hard, amorphous and homogeneous and stable up to at least 1500° C. However, these ceramics generally contain by-products which are difficult to remove. The production of a pure ceramic is thus comparatively complicated. $NH_4Cl$, for example and in particular, occurs as by-product.

It is an object of the invention to provide a process of the type mentioned which avoids the abovementioned disadvantages. The process should nevertheless make it possible to achieve a comparably high yield.

The process is achieved by the borazine precursor being B-tris(hydrosilylvinyl)borazine (also referred to as B-tris(silylvinyl)borazine) and this being converted into ceramic by pyrolysis. It has surprisingly been found that the ceramic produced by this process is essentially pore-free and displays only minimal shrinkage in the conversion into a high-temperature ceramic. The borazine precursor used is liquid at room temperature and can thus be processed particularly readily. For example, this borazine precursor can be applied by painting with a brush or by spraying.

The purity of the ceramic obtained is surprisingly high and the pyrolysis produces, apart from hydrogen, essentially no further gaseous products which are given off. In addition, the yield is exceptionally high. An important advantage of the process of the invention is that no crosslinking and polymer formation is necessary. The borazine precursor can be converted directly into ceramic by means of the pyrolysis. Conversion into a high-temperature ceramic is readily possible by means of a treatment at higher temperature.

In addition, it has unexpectedly been found that the ceramic produced by this process has semiconducting properties. The high conductivity results from the presence of double bonds and the substantial absence of oxygen. The ceramic of the invention is suitable, in particular, for the production of heating elements which can, inter alia, be operated without contacts and are particularly air-stable. A further advantageous application is an antistatic coating, for example for the inside of pipes. Static charging can be avoided by means of such a coating. In addition, the coating is comparatively very stable both thermally and chemically.

The invention is illustrated below with the aid of examples.

The starting point of the synthesis is triethynylborazine of the formula I.

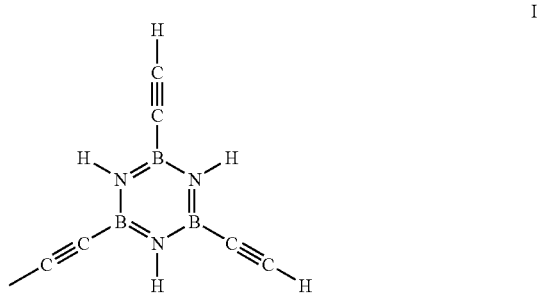

The synthesis of this compound is known and is disclosed, for example, in EP 0570247 A1. B-Tris(trans-trichlorosilylvinyl)borazine can be prepared from this compound.

Preparation of
B-tris(trans-trichlorosilylvinyl)borazine (formula II)

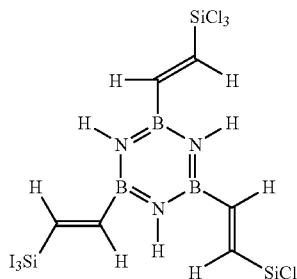

Reaction Equations:

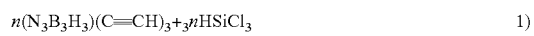

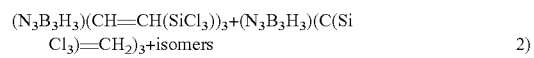

| | | |
|---|---|---|
| Triethynylborazine | 10 g, | 65.6 mmol |
| Trichlorosilane | 54.2 g, | 400 mmol |
| Platinum on carbon (1%) | 1 g, | 0.05 mmol of Pt |

10 g of triethynylborazine are dissolved in 300 ml of toluene, and 1 g of Pt/C(1% Pt) is added. The trichlorosilane is then added via a dropping funnel and the mixture is stirred vigorously, so that the reaction commences. At a reaction temperature of about 80° C. for 12 hours, the components react completely. The Pt/C is subsequently filtered off and excess trichlorosilane and the toluene are then distilled off. The reaction product is finally dried in a high vacuum and is obtained in quantitative yield. The preparation/isolation of the compound (B-tris(trans-trichlorosilylvinyl)borazine in pure form is effected by fractional crystallization of the reaction product from hexane at −30° C. The various isomers can be distinguished quite simply by means of NMR spectra.

$^1$H-NMR (C$_6$D$_6$): 6.85/6.22 (3J=21.3); 4.60

$^{11}$B-NMR: 34.0

$^{13}$C-NMR: 137.4/154(b)

$^{29}$Si—NMR: −3.3

In addition, the identity of this compound has been confirmed by single-crystal structure analysis.

Preparation of B-tris(hydrosilylvinyl)borazine
(formula II or IIIa to IIIc)

EXAMPLE 1

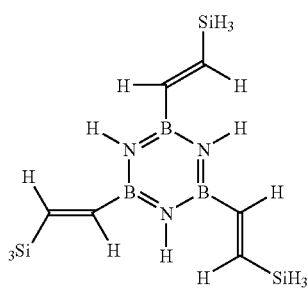

III

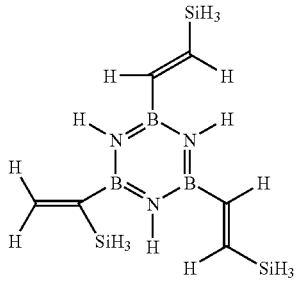

IIIa

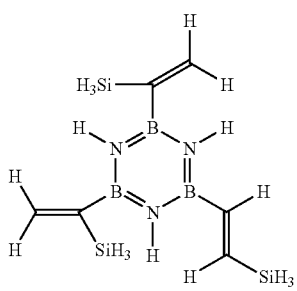

IIIb

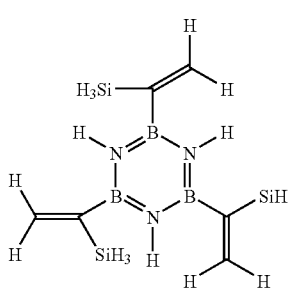

IIIc

Reaction Equations:

$$4(N_3B_3H_3)(CH=CH(SiH_3))_3+9AlH_4 \quad\quad 1)$$

$$4(N_3B_3H_3)(CH=CH(SiH_3))_3+\text{isomers}+LiCl+9AlCl_3 \quad\quad 2)$$

| | | |
|---|---|---|
| B-tris(trans-trichlorosilylvinyl)borazine | 10 g, | 17.9 mmol |
| LiAlH$_4$ | 1.6 g, | 42.1 mmol |

1.6 g of LiAlH$_4$ are suspended in 10 ml of THF and cooled to −20° C. 10 g of B-tris(trans-trichlorosilylvinyl)borazine dissolved in 80 ml of THF are then added dropwise over a period of about 1 hour while maintaining the temperature. After the reaction mixture has warmed to room temperature, it is stirred for another 12 hours. 20 ml of hexane are then added in order to precipitate excess LiAlH$_4$ and part of the AlCl$_3$/LiCl. The solid is filtered off and washed with 10 ml of hexane. The filtrate is freed of the solvents and taken up in a mixture of 150 ml of hexane and 50 ml of toluene. The by-product LiCl is once again filtered off from this suspension. The solvents are removed from the filtrate to give a colorless, highly viscous liquid which becomes solid after drying in a high vacuum. The isomers IIIa to IIIc can be prepared correspondingly.

$^1$H-NMR (C$_6$D$_6$): 4.26/4.96/6.38/6.75 (3J$_{vinyl-trans}$=21.6 Hz; $^3$JHSi—CH=2.8 Hz)

$^{11}$B-NMR: 33.4

$^{13}$C-NMR: 135/153.7 (b)

$^{29}$Si—NMR: −63.1 (JSi—H=199 Hz)

Preparation of B-tris(hydrosilylvinyl)borazine

EXAMPLE 2

Reaction Equations:

$$(N_3B_3H_3)(CH=CH(SiCl_3))_3+9LiHB(Et)_3 \quad\quad 1)$$

$$(N_3B_3H_3)(CH=CH(SiH_3))_3+\text{isomers}+9LiCl+9B(Et)_3 \quad\quad 2)$$

| | | |
|---|---|---|
| B-tris(trans-trichlorosilylvinyl)borazine | 10 g, | 17.9 mmol |
| LiHB(Et)$_3$ 1M in THF | 161.1 ml, | 161.1 mmol of LiHB(Et)$_3$ |

10 g of B-tris(trans-trichlorosilylvinyl)borazine are dissolved in 200 ml of THF and cooled to −50° C. 161.1 ml of a 1 molar solution of LiHB(Et)$_3$ in RHF are added thereto. After the reaction mixture has warmed to room temperature, it is stirred for another 12 hours to complete the reaction. The reaction solution is then evaporated to a volume of about 30 ml, which results in white LiCl starting to precipitate. To precipitate all of the LiCl, 100 ml of toluene are added. The solid is filtered off and washed with 10 ml of toluene. The solvents and the by-product triethylborane are distilled off from the filtrate under reduced pressure. The isomers can also be prepared in this way.

Further suitable precursors which can be converted directly into ceramic by pyrolysis are the compounds of the formulae IVa-IVb and V to Vd, where R is a hydrogen, alkyl, in particular methyl, a phenyl or amine. The abovementioned synthetic methods are applicable to these compounds, for the methyl or phenyl compounds in each case using PhSi(H)Cl$_2$ or $CH_3Si(H)Cl_2$, $Ph_2Si(H)Cl$ or $(CH_3)_2Si(H)Cl$. The subsequent hydrogenation can likewise be carried out as mentioned above.

The analytical data for B-tris((phenyldihydrosilyl)vinyl) borazine are:

$^{29}Si$—NMR: −36.3/$^{11}B$-NMR: 31.7/$^1H$-NMR: 3.7; 4.9; 6.6; 7.6/$^{13}C$-NMR: 153.2; 139.5; 134.1; 131.9; 132.0; 128.5

In the case of B-tris((methyldihydrosilyl)vinyl)borazine, the following analytical data were obtained:

$^{29}Si$—NMR: −30.0/$^{11}B$-NMR: 33/$^1H$-NMR: 0.6; 3.5; 5.0; 6.8/$^{13}C$-NMR: 151.4; 141.0; 4.6

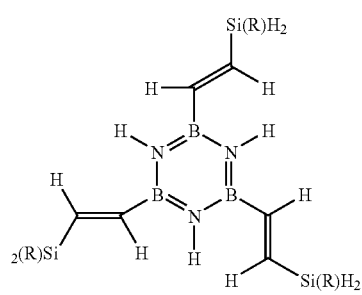

IVa

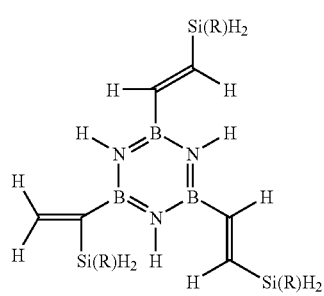

IVb

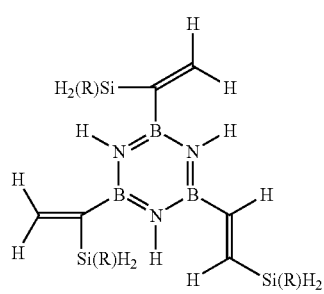

IVc

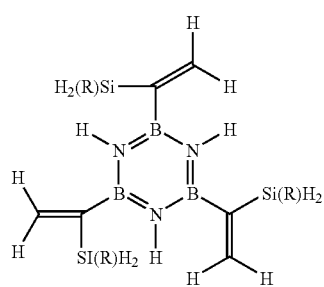

IVd

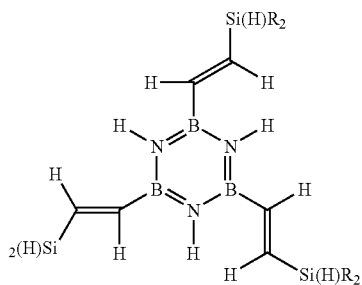

Va

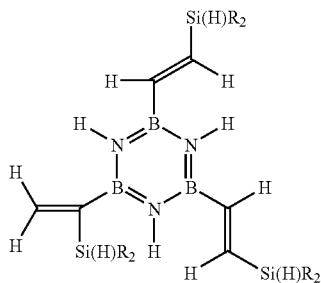

Vb

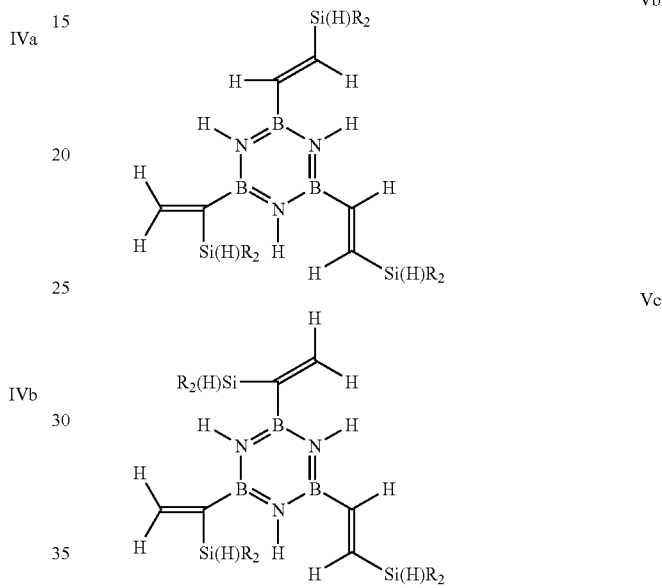

Vc

Vd

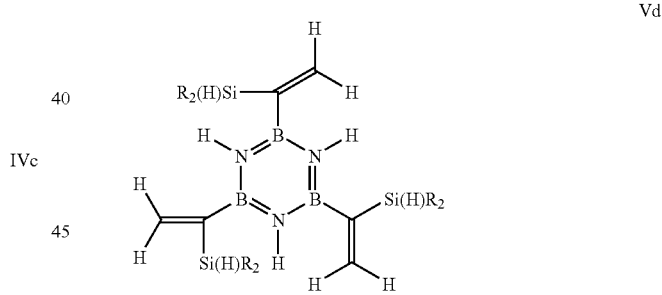

The properties of the ceramic, in particular the electrical, thermal and mechanical properties, can be altered by choice of the R groups. In particular, it has been found that a higher proportion of carbon results in a higher conductivity of the ceramic, which can be explained by a higher proportion of double bonds.

The precursor can be mixed with metal compounds in order to obtain a metal-doped ceramic. For example, this can be achieved by mixing the precursor with organometallic compounds in a solvent, for example THF, acetonitrile, toluene, benzene or hexane, and subsequently pyrolyzing the product as above. Suitable metal compounds have been found to be, in particular: $Fe(CO)_5$, $Fe_2(CO)_9$; ferrocene, bis(1,5-cyclooctadiene)-nickel(0), $LiHB(CH_2CH_3)_3$, $(iBut)_2AlH$. The metal atoms or clusters can be distributed very homogeneously on a nano scale. Up to 1500° C., an amorphous distribution and a metal content up to about 3% are obtained. The thermal decomposition can be accelerated by means of UV radiation.

FIG. 1 shows a micrograph of an iron-doped ceramic, in which the iron is visible as black areas which have a size up to only a few nanometers.

A metal-doped ceramic has an increased electrical conductivity. It can, for example, be heated inductively without contacts by means of an electric field. Such a ceramic can be used, for example, for producing a medical implant. Such a doped ceramic can also be used as a magnetic memory. The magnetic information can, for example, be cleared thermally or by means of an AC field.

The process of the invention is also suitable for producing ceramic particles which are coated with carbon nanotubes, as shown in FIG. 2.

As catalyst for the formation of the nanotubes, use was made of Ni which had been mixed in the form of a suitable soluble compound into the liquid precursor. The nanotubes are formed in situ on the entire surface of the ceramic during the pyrolysis. Very small parts having a high density of nanotubes can be obtained. The nanotubes are suitable, for example, as catalyst supports. The high thermal and chemical stability of the ceramic substrate is advantageous here.

B-Tris(hydrosilylvinyl)borazine is liquid at room temperature after the addition of even a small amount of solvent and can be applied as such by means of a brush or by spraying. The spreading properties can be adjusted by means of a suitable solvent. This is particularly important for the application of thin layers. An appropriate thixotropy can likewise be set here. In this way, different layer thicknesses can be ensured precisely. For example, the insides of pipes can be coated with B-tris(hydrosilylvinyl)borazine or solutions thereof.

Pyrolysis of B-tris(hydrosilylvinyl)borazine converts it into a ceramic material in a surprisingly high yield. The ceramic yield was 94% in the abovementioned examples. The pyrolysis is preferably carried out using a prepyrolysis at a temperature below 1000° C. and a pyrolysis at a temperature of from >1000° C. to about 2000° C. The ceramic material can also be produced by pyrolysis of the isomeric compounds or from a mixture of isomers.

An important advantage of this method of production is that no crosslinking and polymer formation is necessary. The B-tris(hydrosilylvinyl)borazine is converted directly into ceramic by pyrolysis. During the pyrolysis, essentially only hydrogen is released as decomposition product. This gives a ceramic which is essentially pore-free and very dense. The shrinkage during pyrolysis is very low. A surprising additional aspect is the high stability of the ceramic, which can be explained by better crosslinking due to the many double bonds. The comparatively large number of double bonds and the substantial absence of oxygen gives a conductive ceramic. This leads to the following preferred uses of the ceramic produced by this process:

Owing to the high thermal stability and electrical conductivity, the ceramic is particularly useful for the production of heating elements and in particular contact-free heating elements. The conductivity of the ceramic of the invention can be seen from the measured curve in FIG. 3.

A further important advantage is the comparatively high air stability of the ceramic. This air stability is also present at high temperatures.

A further preferred use is the production of ceramic coatings. Owing to the comparatively high electrical conductivity, such coatings are antistatic. In addition, they are thermally and chemically stable. In particular, it is possible to produce coatings on the inside of pipes, for example for the transport of liquids. Coating is effected by means of B-tris(hydrosilylvinyl)borazine, for example by painting or spraying. It is likewise possible to apply solutions of this compound. The ceramic can also be added, for example as powder, to known coating compositions, for example to increase the conductivity. The ceramic is particularly suitable for the production of enamels, since the ceramic retains properties, in particular the conductivity, even at relatively high temperatures. After application, pyrolysis is carried out.

The properties of the ceramic can be altered by the molecules of the precursor being crosslinked, preferably one-dimensionally or two-dimensionally, prior to pyrolysis. In particular, the borazine molecules can be crosslinked in a chain-like manner by crystallization, with mixed crystals also being conceivable. Such crosslinking prior to pyrolysis results in the ceramic having a higher flexibility. This flexibility can be influenced by the degree and type of crosslinking prior to pyrolysis and can thus be matched to the desired properties.

Further uses and applications of the ceramic of the invention are conceivable. In particular, various semiconductor components can be produced using the ceramic.

BRIEF DESCRIPTION OF THE FIGURES

FIG. 1 shows a micrograph of an iron-doped ceramic, in which the iron is visible as black areas which have a size up to only a few nanometers.

FIG. 2 shows ceramic particles coated with carbon nanotubes.

FIG. 3 shows measured conductivity of the ceramic of the instant invention.

Figure 1:
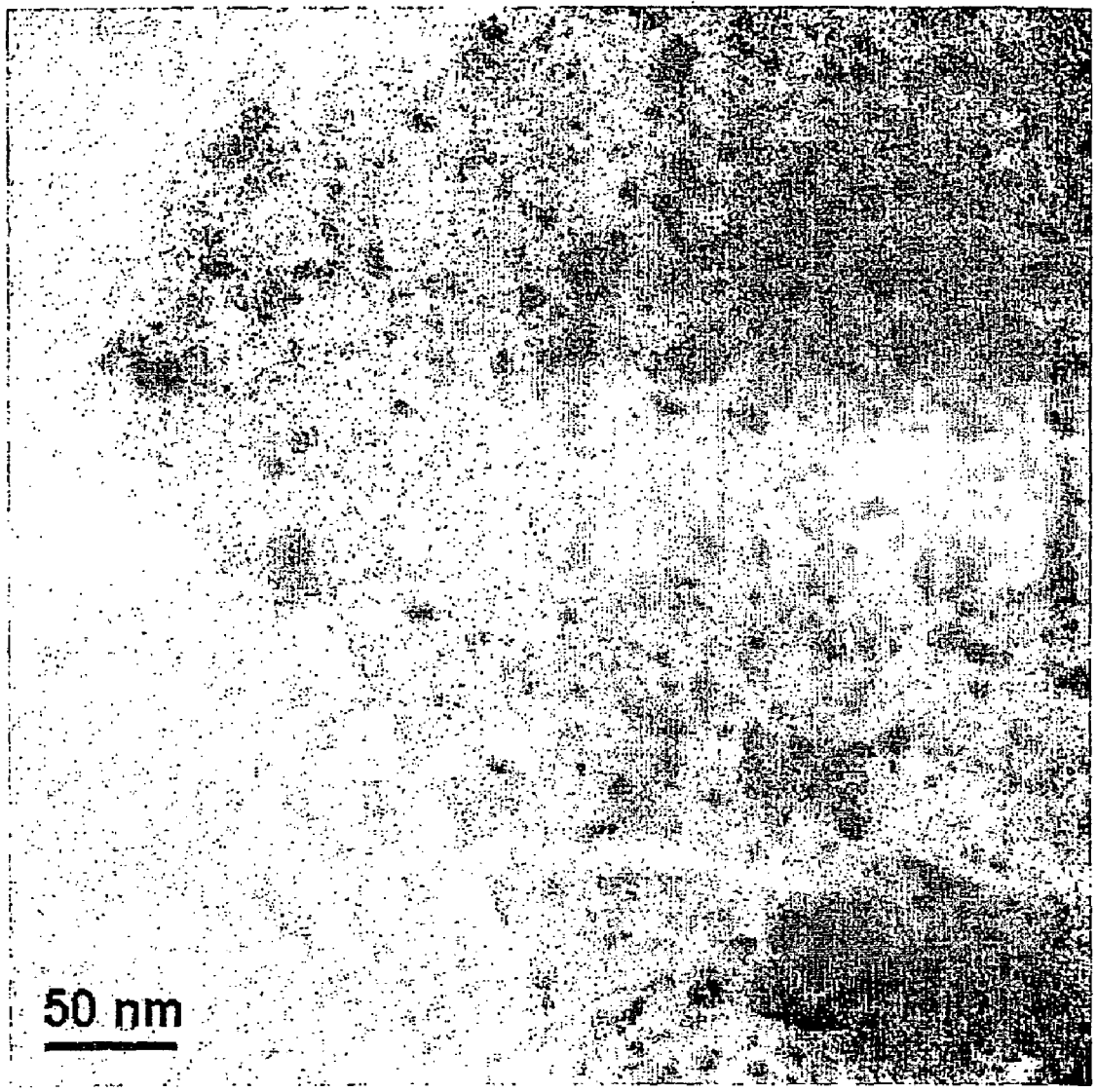
FIG. 1.
Figure 2:
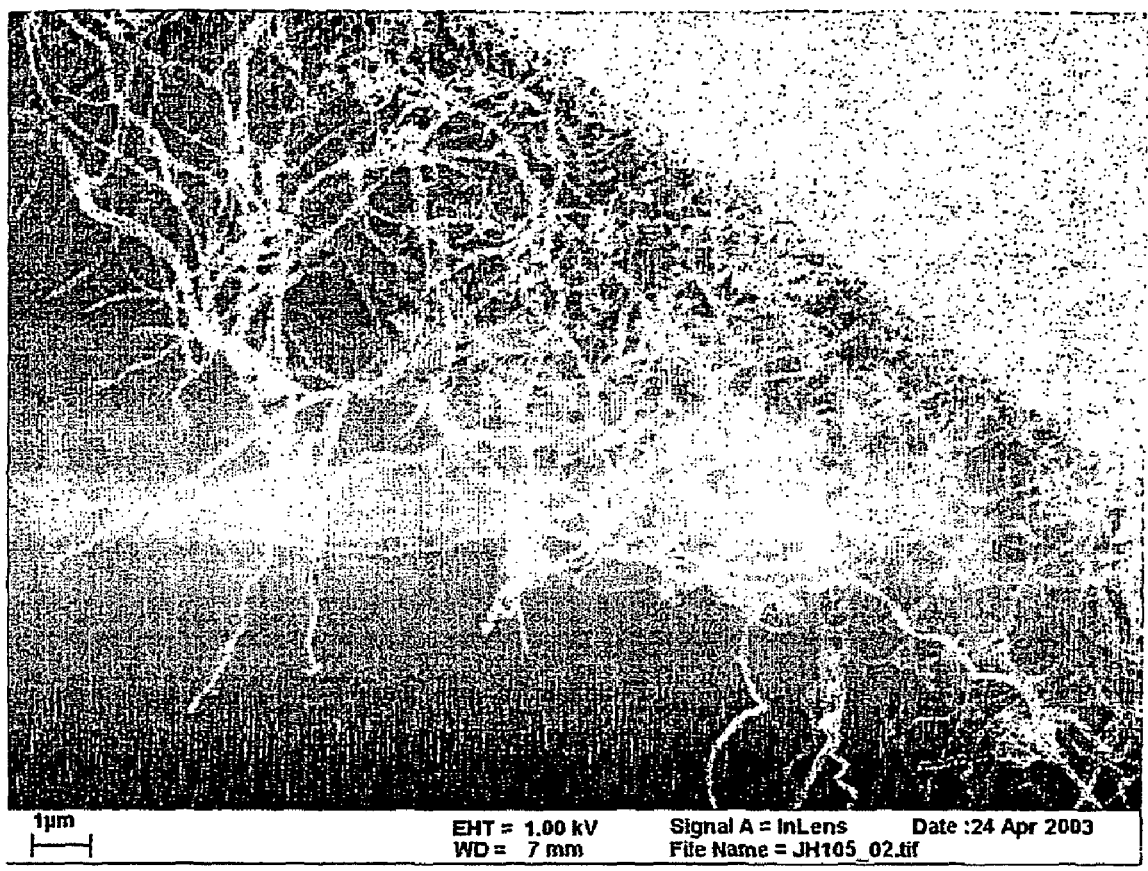
FIG. 2.
Figure 3:
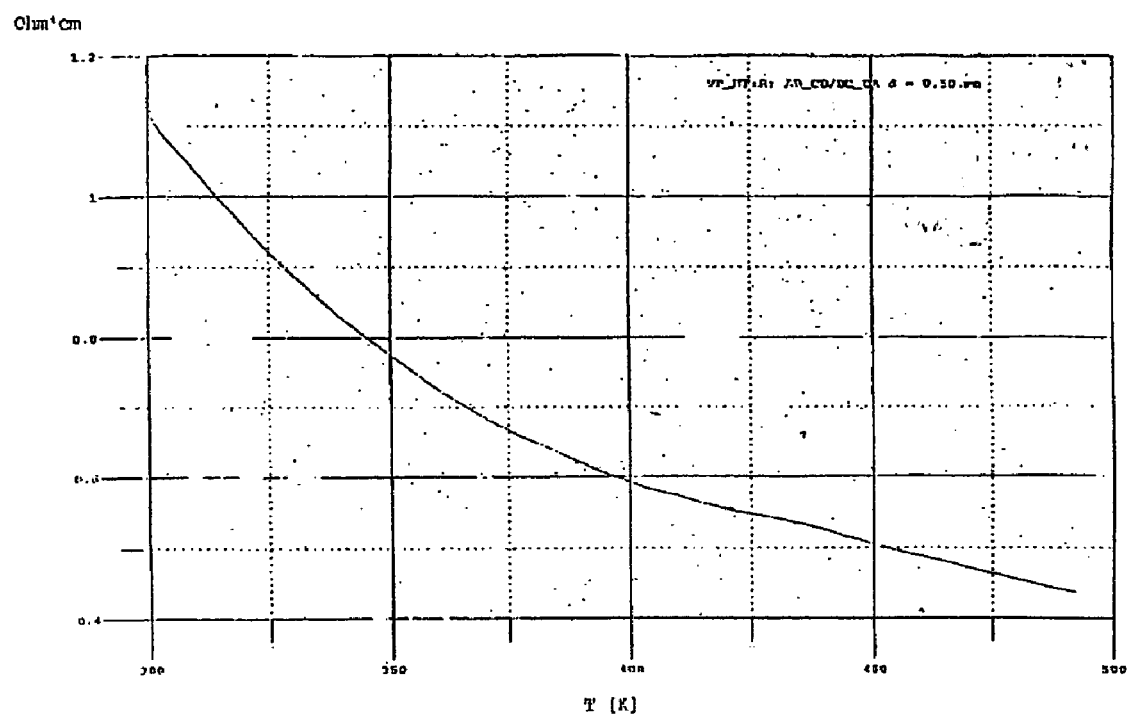
FIG. 3.

The invention claimed is:

1. A process for producing a B/N/C/Si ceramic from a borazine precursor, characterized in that the borazine precursor is B-tris(hydrosilylvinyl)borazine and this is converted into ceramic by pyrolysis.

2. The process as claimed in claim 1, characterized in that the B-tris(hydrosilylvinyl)borazine is prepared by hydrogenation of B-tris(trichloro-silylvinyl) borazine.

3. The process as claimed in claim 2, characterized in that the B-tris(trichlorosilylvinyl)borazine is prepared from B-tri-ethynylborazine by hydrosilylation.

4. The process as claimed in claim 1, characterized in that the B-tris(hydrosilylvinyl)-borazine is applied to a substrate in liquid form and is subsequently pyrolyzed.

5. The process as claimed in claim 4, characterized in that B-tris(hydrosilylvinyl)borazine is dissolved in a solvent and is made thixotropic.

6. The process as claimed in claim 4, characterized in that B-tris (hydrosilylvinyl) borazine or a solution thereof is applied to said substrate by painting or spraying and is subsequently pyrolyzed.

7. The process as claimed in claim 1, characterized in that the B-tris(hydrosilylvinyl)-borazine is, after a prepyrolysis, converted into a high-temperature ceramic at a higher temperature in the range from 1000° C. to 2000° C., optionally 1100-1300° C.

8. The process as claimed in claim 1, characterized in that the precursor is doped with a metal or a metal compound to produce a doped ceramic.

9. The process as claimed in claim 1, characterized in that the molecules of the borazine precursor are one-dimensionally or two-dimensionally crosslinked prior to the pyrolysis.

10. A process for producing a B/N/C/Si ceramic from a borazine precursor, characterized in that the borazine precursor is selected from B-tris((phenyldihydrosilyl)vinyl)borazine or B-tris((methyldihydrosilyl)vinyl)borazine, wherein the said borazine precursor is converted into ceramic by pyrolysis.

11. The process of claim 1 wherein said ceramic is formed as a coating.

12. The process as claimed in claim 11, characterized in that the coating is antistatic.

13. The process as claimed in claim 11, characterized in that the coating is an interior coating, optionally of a pipe.

* * * * *